United States Patent Office 2,957,815
Patented Oct. 25, 1960

2,957,815

POWER PLANT INCLUDING A GAS-COOLED NUCLEAR REACTOR

Pierre Henri Pacault and Jean Frederic Tillequin, Paris, France, assignors to Babcock & Wilcox Limited, London, England, a British company Filed Sept. 12, 1957, Ser. No. 683,538

Claims priority, application France Sept. 22, 1956

8 Claims. (Cl. 204—193.2)

The present invention relates to power plant of the kind including a gas-cooled nuclear reactor having in its closed coolant circuit heat exchange means including a vapor generator arranged to supply vapour to turbine means.

In present atomic power stations, the cooling of the reactor necessitates special, complex and troublesome apparatus. It is, in fact, essential to maintain appropriate cooling of the reactor, in all circumstances, which requires motors able to operate independently of the reactor for driving the blowers effecting circulation of the cooling gas, whilst special regulating apparatus is required to regulate the forced draught power when variations in the heat liberated in the reactor occur.

It is an object of the invention to provide simplified means for ensuring the requisite gas circulation for cooling the reactor.

Another object of the invention is the achievement of a notable gain in efficiency as compared with that of a plant using an electric motor.

The invention provides power plant comprising a gas-cooled nuclear reactor, heat exchange means including a vapour generator formed with vapour outlet means, blower means, coolant confining means connecting the blower means, the nuclear reactor and the heat exchange means in series relationship in a closed coolant circuit, a blower turbine, means coupling the blower turbine to the blower means, a main turbine and vapour conducting means connecting the main turbine and the blower turbine for series flow of vapour from said vapour outlet means through said main and blower turbines.

In one embodiment of the invention the heat exchange means includes a plurality of vapour generators disposed one after another in the coolant gas flow path through the heat exchange means and adapted to operate at different pressures decreasing from vapour generator to vapour generator in the direction of coolant gas flow.

Advantageously the nuclear reactor, the heat exchange means, the blower means and the blower turbine are enclosed in a protective casing.

Further objects and advantages will be apparent from the subsequent description of the invention.

The invention will now be described, by way of example, with reference to the accompanying diagrammatic drawings, in which.

Figure 1:
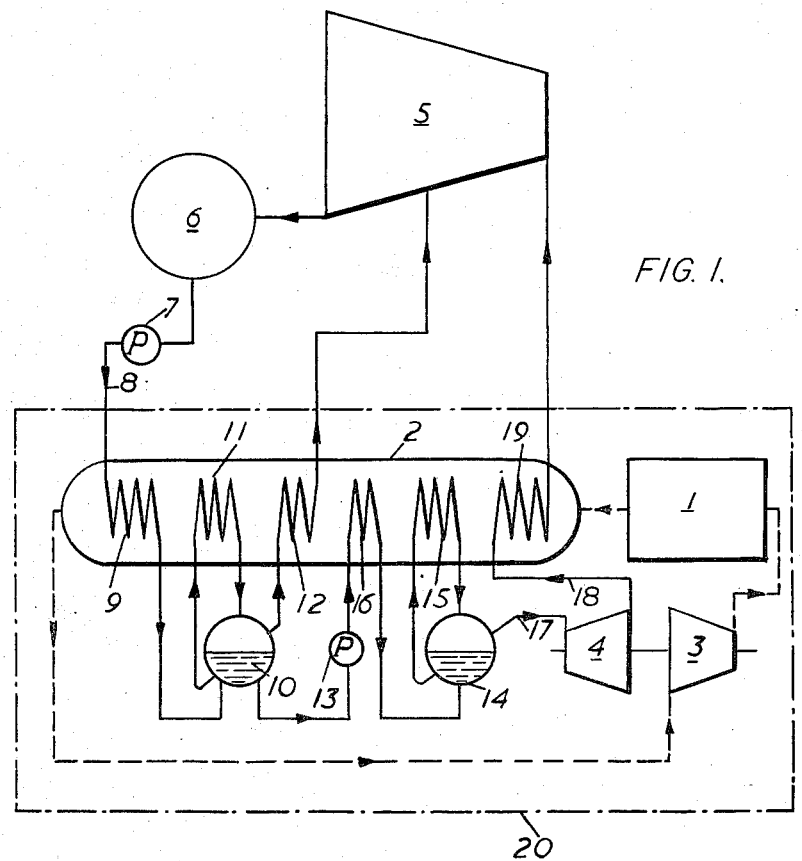
Figure 1 shows power plant including a gas cooled nuclear reactor.

The drawing shows power plant in which a nuclear reactor 1 is gas-cooled in known manner, the gas being circulated under pressure in a closed circuit indicated by broken lines and being heated in the reactor, cooled in heat exchange means 2 and delivered to the reactor by a blower 3 driven by a steam turbine 4.

The heat exchange means 2, which includes a low pressure vapour generator 11 and a high pressure vapour generator 15, serves to generate and superheat steam for driving a main steam turbine 5 forming part of a turbo-alternator group. The exhaust steam of the turbine 5 enters a condenser 6 and the condensate is returned to the heat exchange means 2 by a feed pump 7 through a pipe 8. The installation also comprises in general extraction pumps and regenerative feed water heaters (not shown). The heat exchange means could, of course, include more than two vapour generators adapted to operate at different pressures decreasing from vapour generator to vapour generator in the direction of coolant flow.

The liquid delivered through the pipe 8 passes through an economiser 9 and feeds the drum 10 of the low pressure vapour generator 11. The steam developed in the latter is admitted, after having passed through a low pressure superheater 12, to the low pressure stage of the main turbine 5. A part of the liquid in the drum 10 is taken by a high pressure feed pump 13 and introduced into the drum 14 of the high pressure vapour generator 15, through the intermediary of a high pressure economiser 16.

The saturated steam from the high pressure vapour generator 15 is led by a duct 17 to the steam turbine 4 coupled to the blower 3 and, after expansion in this turbine, the steam is led by a duct 18 to a high pressure superheater 19, whence it is delivered to the high pressure stage of the main turbine 5. Thus, it will be seen that the driving turbine 4 of the blower 3 is placed in series with the main turbine as regards steam flow.

It may be shown that, with such an arrangement, the steam turbine 4 having been calculated for normal working load, the turbine 4 continues to produce, at different loads, a power equal to the blowing power necessary to cool the reactor. The arrangement described, therefore, ensures automatic regulation of the blowing power as a function of the load, without the necessity of using regulating apparatus. This automatic regulation is especially important from the point of view of safety, since suitable cooling of the reactor is ensured under all circumstances, notably in the case of insertion of the shut-off rods of the reactor or of over-power.

The arrangement described conduces in addition, to a notable increase in the thermo-dynamic efficiency of the installation. In the case of an existing installation, calculations effected on hypotheses far from being the most favourable have shown that the efficiency increases by at least 3%.

Another advantage of the arrangement is that the turbine coupled to the blower can be installed inside a protective casing 20, indicated on the drawing by chain lines, which it may be necessary to establish around the reactor and the heat exchange means. This protective casing serves to enclose, for reasons of safety, the whole of the elements situated in the gas circuit within one and the same enclosure. The turbine in question, being a back pressure turbine, does not require any connection to auxiliary apparatus, such as a condenser, outside the enclosure.

If desired, instead of expanding the saturated steam issuing from the high pressure vapour generator in the turbine coupled to the blower, the said turbine may be connected to the outlet from the low pressure vapour generator or, in the event of the heat exchange means comprising more than two pressure stages, to the outlet of an intermediate pressure vapour generator. Moreover, a superheater may be included between the blower turbine and the vapour generator to which it is connected as is shown in Figure 2 in which like reference numerals refer to similar parts of Figure 1.

Figure 2:
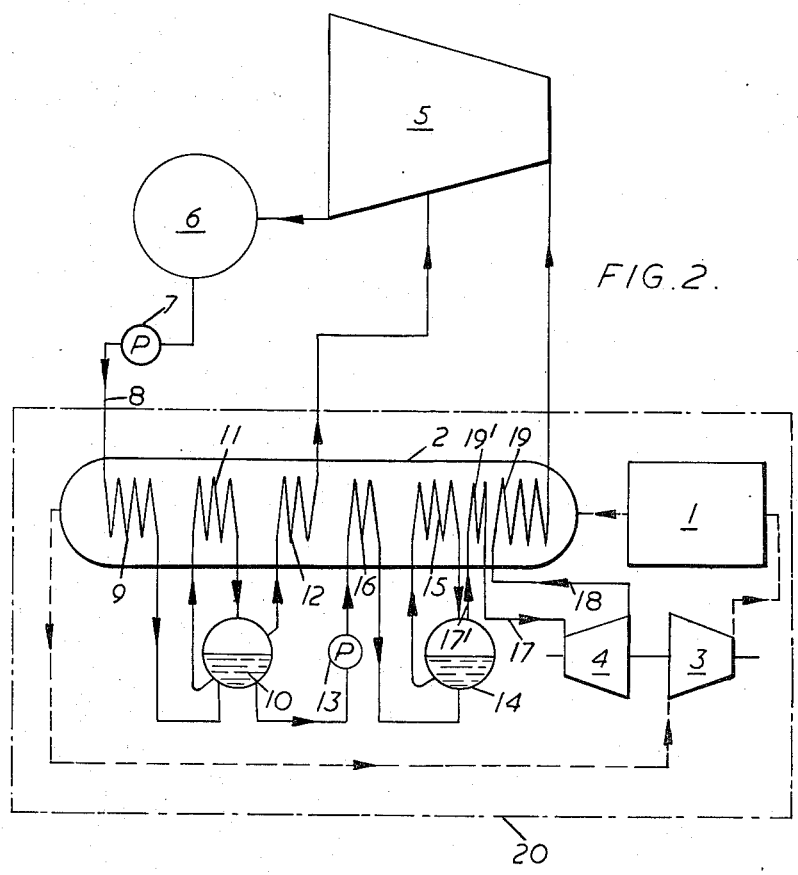
Figure 2 shows a modification to the plant of Figure 1.

In Figure 2 steam from the drum 14 of the high pressure vapour generator passes through the duct 17' to a first superheater section 19' and thence to the blower turbine 4. Steam is exhausted from the blower turbine 4 to the second stage of superheater 19 as has been described with reference to Figure 1.

It will be appreciated by those skilled in the art that further changes may be made in the form of the invention without departing from the spirit of the invention covered by the subsequent claims.

What is claimed is:

1. Power plant comprising a gas-cooled nuclear reactor, heat exchange means including a vapour generator formed with vapour outlet means, blower means, coolant confining means connecting the blower means, the nuclear reactor and the heat exchange means in series relationship in a closed coolant circuit, a blower turbine, means coupling the blower turbine to the blower means, a main turbine and vapour conducting means connecting the main turbine and the blower turbine to said vapour outlet means for series flow of vapour from said vapour outlet means to said blower turbine and from said blower turbine to said main turbine.

2. Power plant comprising a gas-cooled nuclear reactor, heat exchange means including a vapour generator and vapour heater formed with superheated vapour outlet means, blower means, coolant confining means connecting the blower means, the nuclear reactor and the heat exchange means in series relationship in a closed coolant circuit, a blower turbine, means coupling the blower turbine to the blower means, a main turbine and vapour conducting means connecting the main turbine and the blower turbine for series flow of vapour from said superheated vapour outlet means through said blower and main turbines.

3. Power plant comprising a gas-cooled nuclear reactor, heat exchange means including a vapour generator formed with vapour outlet means, blower means, coolant confining means connecting the blower means, the nuclear reactor and the heat exchange means in series relationship in a closed coolant circuit, a blower turbine, means coupling the blower turbine to the blower means, a vapour heater forming a part of said heat exchange means and adapted to receive vapour exhausted from said blower turbine, a main turbine and vapour conducting means connecting the main turbine to said vapour heater and said blower turbine to said vapour outlet means for series flow of vapour from said vapour outlet means through said blower turbine, said vapour heater and said main turbine.

4. Power plant comprising a gas-cooled nuclear reactor, heat exchange means including a vapour generator and a first vapour heater formed with superheated vapour outlet means, blower means, a blower turbine, means coupling the blower turbine to the blower means, a second vapour heater forming a part of the heat exchange means and adapted to receive vapour exhausted from said blower turbine, a main turbine and vapour conducting means connecting said main turbine to said second vapour heater and said blower turbine to said superheated vapour outlet means for series flow of vapour from said vapour generator through said first vapour heater, said blower turbine, said second vapour heater and said main turbine.

5. Power plant comprising a gas-cooled nuclear reactor, heat exchange means including a plurality of vapour generators formed with respective vapour outlet means, blower means, a blower turbine, means coupling the blower turbine to the blower means, coolant confining means connecting the blower means, the nuclear reactor and the heat exchange means in series relationship in a closed coolant circuit and the vapour generators being disposed one after another in the coolant circuit and adapted to operate at different pressures decreasing from vapour generator to vapour generator in the direction of coolant gas flow, a main turbine including different pressure parts, vapour conducting means connecting respective pressure parts of said main turbine to the vapour outlet means of corresponding vapour generators, said vapour conducting means including means connecting the main turbine and the blower turbine to the vapour outlet means of one of the vapour generators for series flow of vapour from said one of the vapour generators through said blower turbine to the associated pressure part of said main turbine.

6. Power plant as claimed in claim 5, wherein each vapour generator except that at highest pressure is associated with means including a feed pump for the supply of liquid therefrom to the adjacent vapour generator at higher pressure.

7. Power plant as claimed in claim 6, wherein the blower turbine is connected in series between the main turbine means and the vapour generator of highest pressure.

8. Power plant comprising a gas-cooled nuclear reactor, heat exchange means including a vapour generator formed with vapour outlet means, blower means, coolant confining means connecting the blower means, the nuclear reactor and the heat exchange means in series relationship in a closed coolant circuit, a blower turbine, means coupling the blower turbine to the blower means, a main turbine, vapour conducting means connecting the main turbine and the blower turbine for series flow of vapour from said vapour outlet means through said blower and main turbines and a protective casing enclosing the nuclear reactor, the heat exchange means, the blower means and the blower turbine.

References Cited in the file of this patent

UNITED STATES PATENTS

| 1,258,165 | Trump | Mar. 5, 1918 |
| 2,613,504 | Warren | Oct. 14, 1952 |
| 2,782,158 | Wheeler | Feb. 19, 1957 |